United States Patent [19]

Hashimoto et al.

[11] Patent Number: 4,855,772
[45] Date of Patent: Aug. 8, 1989

[54] ELECTRONICALLY CONTROLLED CAMERA

[75] Inventors: Isamu Hashimoto; Takao Nishida, both of Tokyo, Japan

[73] Assignee: Asahi Optical Co., Ltd., Tokyo, Japan

[21] Appl. No.: 173,560

[22] Filed: Mar. 25, 1988

[30] Foreign Application Priority Data

| Mar. 26, 1987 | [JP] | Japan | 62-45012[U] |
| Mar. 26, 1987 | [JP] | Japan | 62-45013[U] |
| Mar. 26, 1987 | [JP] | Japan | 62-45014[U] |
| Mar. 26, 1987 | [JP] | Japan | 62-45015[U] |

[51] Int. Cl.⁴ .................................................. G03B 1/12
[52] U.S. Cl. ................................................... 354/173.1
[58] Field of Search ........................ 354/173.1, 173.11

[56] References Cited

U.S. PATENT DOCUMENTS

4,724,451 2/1988 Desormeaux ............... 354/173.1 X
4,739,354 4/1988 Kobayashi et al. ............... 354/173.1

Primary Examiner—Michael L. Gellner
Attorney, Agent, or Firm—Sandler & Greenblum

[57] ABSTRACT

An electronically controlled camera is provided which has a back cover switch adapted to be turned ON/OFF according to the opening/closing position of a back cover; a back cover switch data detecting device for detecting switch data relating to the back cover switch, at a predetermined cycle, and for outputting such data; an erasable programmable memory for memorizing the switch data output from the back cover switch data detecting device; and a control device for comparing the switch data from the latest cycle output from the back cover switch data detecting device with the switch data from the preceding cycle read from the memory, and for controlling a film advance motor, a display system and the memory.

22 Claims, 9 Drawing Sheets

FIG.10

ELECTRONICALLY CONTROLLED CAMERA

BACKGROUND OF THE INVENTION

1. Field of the Invention

This invention relates to an electronically controlled camera for electronically controlling a film advance motor contained therein based on the data from various data input means. More particularly, it relates to an auto load system for automatically winding the film up to a first exposable frame of the film, an auto wind system for automatically winding one frame of the film after shutter released, a film rewind system for rewinding the film into a film cartridge after the completion of exposure, and data processing for these systems.

2. Prior Art Statement

In recent times the development of automatic and electronic still cameras, such as lens shutter cameras, single-lens reflex cameras, etc. has been marvelous.

For example, control devices for controlling the focussing by an automatic range finder, flashing, shutter speed, the aperture, etc., which are all used for photographing, as well as the various devices such as for automatically loading the film when the film is loaded, and for automatically winding or rewinding the film, have been and are still being gradually and steadily progressed.

However, since the camera itself has, by its nature, limitations in size, weight, etc. whenever the functions thereof are diversified, it is a very important problem to solve, when developing, how to well build these functions into a compact camera body.

In recent times, therefore, in view of the extensive development of semiconductors, electronic control means, which are capable of performing more complicated controlling work and are yet compact, are often used instead of conventional mechanical controlling means.

Heretofore, cameras equipped with the aforementioned auto load systems have been used. These kinds of conventional cameras have a switch, for load only, which is held in the "on" position from a time when the back cover is closed until a time when the loading of the film is finished, and is.

Besides the above-mentioned cameras, there have also been used other types of cameras, which display the data of the frame number and the finish of the film rewinding procedure on a liquid crystal display panel, etc., electrically. A conventional camera of this type is provided with a back cover switch for detecting the opening or closing action of the back cover in order to clear these data when the film is taken out.

However, in case various exclusive-use switches are provided for various functions, the number of switches required in accordance with the diversified functions is necessarily increased. As a result, the mechanical structure thereof becomes complicated, and thus undesirable both from spacewise and weightwise points of view.

Further, conventional cameras are not equipped with a system for detecting whether the film is normally loaded or not. Therefore, the user is obliged to judge the film loading by the indication of a film counter which is actuated irrespective of the presence of the film.

Because of the foregoing reasons, users are unable to easily confirm even when film is not normally loaded.

Although there is known a camera which has a switch for detecting a stationary film state, the camera is insufficient for judging whether the film is normally loaded.

Next, attention is directed to the auto wind system. Conventional cameras detect the over-end of the film (wound up to the final frame of the film) by the increase of load applied to a film advance motor and the time-over of a timer set.

However, in a system such as mentioned above, the user must repeat such actions so as to turn on a shutter release switch for sending an electric current to a film advance motor and to cut the current due to time-over, since he cannot otherwise confirm the over-end state. The repetition of the above-mentioned actions causes adverse effects, such as breakage of film due to the winding force of the motor, an increase in backlash of the gear system of the film advance system, and consumption of battery power.

SUMMARY OF THE INVENTION

The present invention has been accomplished in view of the various problems mentioned above. It is therefore an object of the present invention to provide an electronically controlled camera, in which the mechanical system is simplified by applying an electronical control system thereto, and in which the consumption of electric power and adverse affects to the system can be eliminated by memorizing various data detected.

In order to achieve the above-mentioned object, an electronically controlled camera according to the present invention uses, as input signals, the opening-and-closing of a back cover, the number of the frame, the film advance condition, the finish of the film winding procedure, and the on/off status of a film rewind switch. The control means judges the state of the camera by a combination of these signals or by a combination of these signals and a timer. Based on such judgment, the control means carries out the control related and the film advance action, such as loading of the film, winding of the film, and rewinding of the film. Moreover, this camera is capable of reading necessary information in accordance with necessity so as to be subject to the use for controlling the system and indicating the information, because it is provided with a memory for memorizing the controlling status.

BRIEF DESCRIPTION OF THE DRAWINGS

FIGS. 1 through 10 illustrate one embodiment of an electronically controlled camera according to the present invention.

FIGS. 1 through 4 illustrate the outer appearance of the camera, in which

FIGS 6 through 10 are flowcharts showing the operation of the camera, in which

DETAILED DESCRIPTION OF THE PREFERRED EMBODIMENTS

The present invention will be described with reference to the accompanying drawings. FIGS. 1 through 4 illustrate a single-lens reflex camera according to one embodiment of the present invention. In the illustrated single-lens reflex camera, such film operation as loading of the film, winding of the film, rewinding of the film, etc., can be performed by motor. Moreover, these actions are automatically controlled according to programs contained therein and signals from various switches as will be described afterward.

As is shown, this camera comprises a camera body 1 and a lens 2 removably mounted on the body 1.

Figure 1:
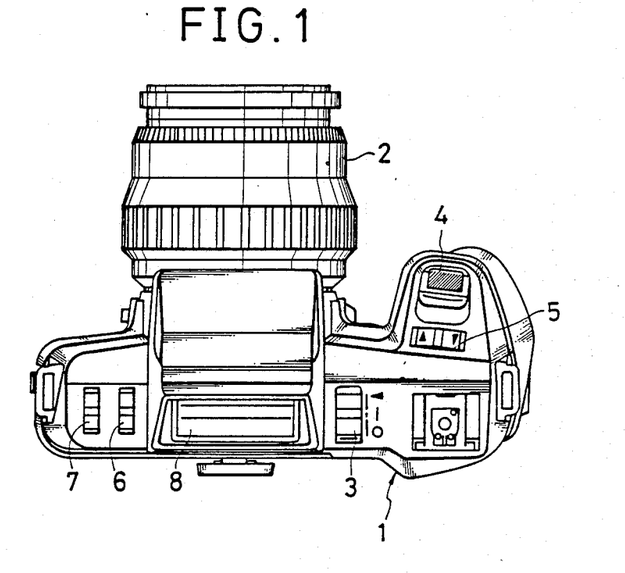
FIG. 1 is a plan view.

The body 1 is provided on its top with a main switch 3, a shutter release switch 4, a selection lever 5, a mode/drive lever 6, and an ISO/exposure compensation lever 7 as shown in FIG. 1. The body 1 is also provided on its central pentaprism housing with a liquid crystal panel (hereinafter simply referred to as the "LCD panel")for concentratedly displaying the film state, conditions established in the camera, and various data required for photographing.

Figure 2:
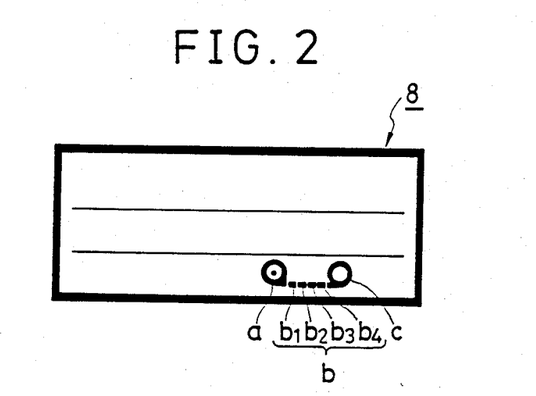
FIG. 2 is an enlarged plan view of a liquid crystal display panel.

The LCD panel 8, as shown in its enlarged scale in FIG. 2, is provided with a, b1, b2, b3, b4 and c as segments for indicating information related to the film advance action.

Figure 3:
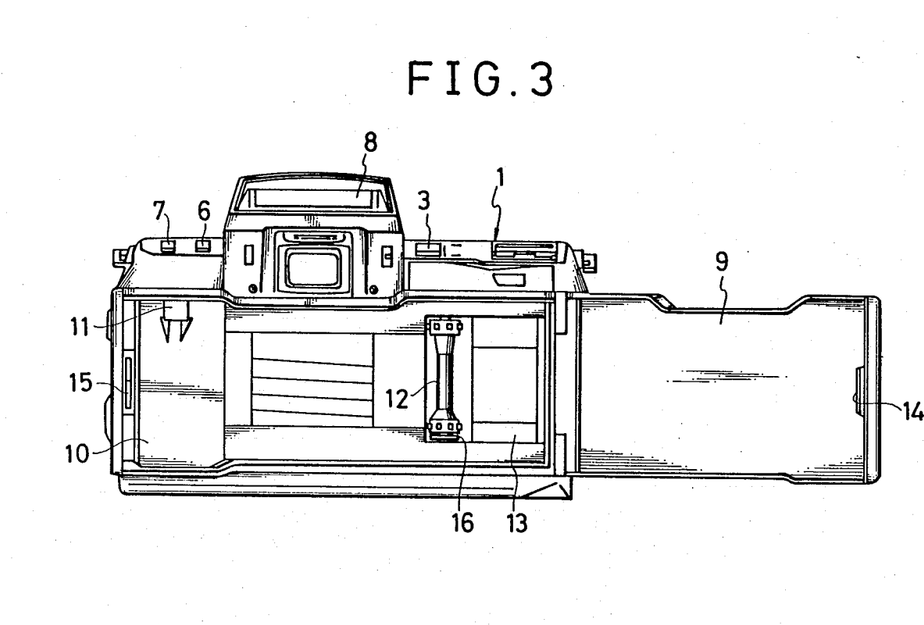
FIG. 3 is a rear view of the camera with its back cover opened.

When a back cover 9 on the back of the body 1 is opened as shown in FIG. 3, a film cartridge chamber 10, a film rewind spindle 11, a sprocket 12, and spool 13, etc., can be seen. The film rewind spindle 11 is driven by a film advance motor (not shown) contained in the body 1 when the film is rewound. The sprocket 12 and the spool 13 are driven by the film advance motor when the film is wound. These two drive systems are constituted as such that when one of them is in drive, condition the other is free.

The body 1 is further provided on one side thereof with a back cover switch 15 which is turned on or off by the engagement or disengagement of a nail piece 14 provided on the free end side of the back cover 9. A roller 16, coaxial with sprocket 12, is rotatable independently of the sprocket 12. When the back cover 9 is closed, the roller 16 contacts with the lower edge of the film under pressure, and is rotated according to the advancement of the film. A film advance switch, which will be described afterward, is turned on/off in accordance with the rotation of the roller 16, and detects the advancing state of the film.

Figure 4:
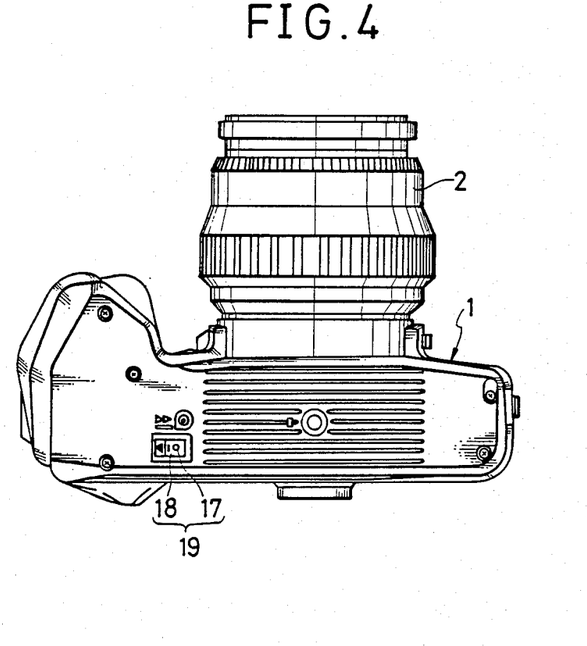
FIG. 4 is a bottom view thereof.

The body 1, as shown in FIG. 4, is provided on its bottom with a film rewind switch 19 comprising a film rewind button 17 for unlocking the lock and a film rewind lever 18 which is slidable when the film rewind button 17 is in its pushed-in position. The film rewind lever 18 is mechanically, constituted such that it holds the rewinding position by sliding only when the back cover 9 is closed, and when the back cover 9 is opened, it is returned to its normal "OFF" position from the rewinding position.

Within the body 1, there is also provided a film wind detection switch in addition to the above-mentioned various switches. This switch is a mechanical switch which turns on together with the shutter release and turns off when the film advance motor has rotated for an amount enough for winding one frame of the film. This film wind detection switch outputs a signal relating to an auto wind system as will be described afterward.

Next, the outline of a control circuit, which is contained in a single-lens reflex camera according to the present invention, will be described with reference to FIG. 5.

Figure 5:
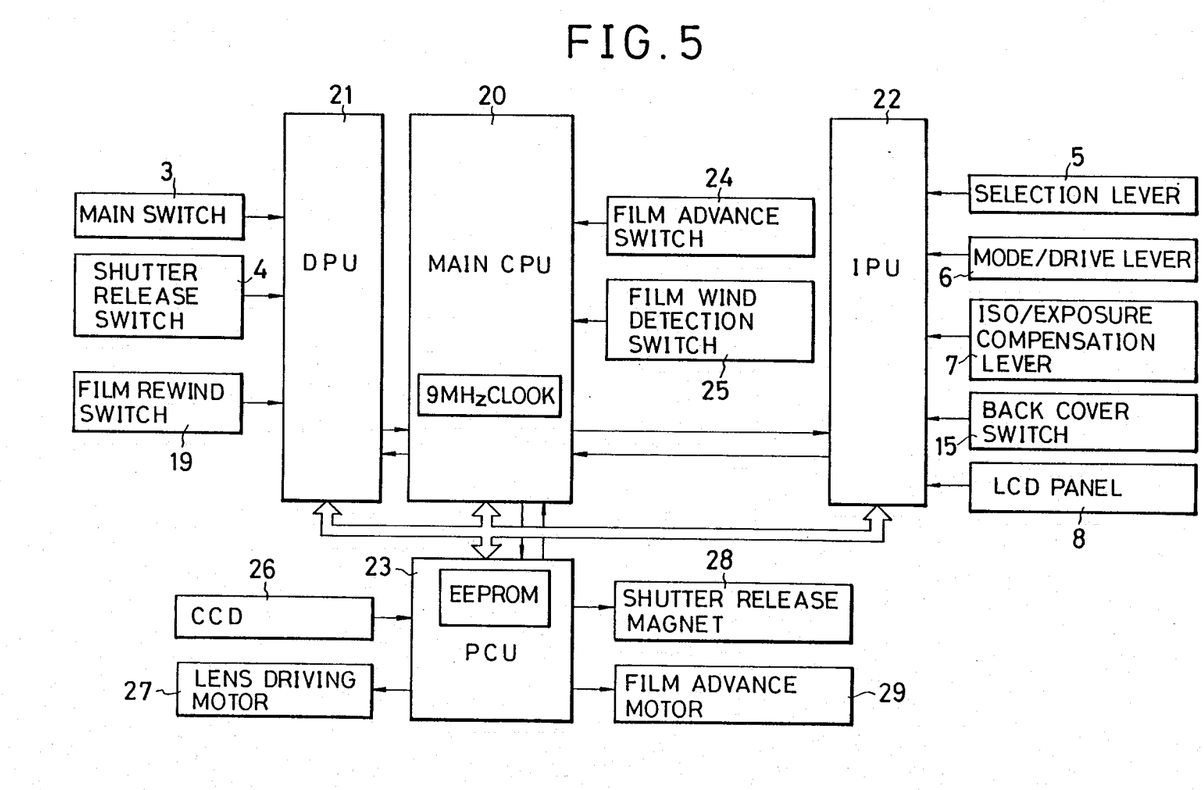
FIG. 5 is a block diagram showing the outline of a control circuit.

The control circuit shown in FIG. 5 comprises various LSIs such as a main CPU 20, two CPUs of a DPU (Data Processing Unit) 21 and an IPU(Indication Processing Unit) 22, a PCU(Power Control Unit), each having a different function, and peripheral units thereof.

The main CPU 20 is an 8-bit microcomputer which contains a 16K-byte ROM (Read-Only Memory), a RAM (Random Access Memory) area of several hundred bytes, and an 8-bit A/D (Analog to Digital ) converter, and operates on a 9-MHz high-speed clock frequency. The main CPU 20 is connected to the DPU 21, the IPU 22 and the PCU 23 by 4- to 7-bit common bus lines. Further, the main CPU 20 is input with switch data of the afore-mentioned film advance switch 24 and film wind detection switch 25.

The DPU 21 is a 4-bit microcomputer and chiefly undertakes data processing (not described) relating to a photometer and a strobo. The DPU 21 is input with switch data of the main switch 3 and the shutter release switch 4.

The IPU 22 is a 4-bit microcomputer and chiefly controls the display of the LCD panel 8. The IPU 22 memorizes and stores data such as the film state, the number of the frame exposed, etc. which are displayed on the LCD panel 8 as long as electric power is supplied. The IPU 22 is input with switch data of the select lever 5, the mode/drive lever 6, the ISO/exposure compensation lever 7, and the back cover switch 15.

The PCU is comprises an EEPROM (Electrically Erasable Programmable Read-Only Memory), and a CMOS (Complimentary Metal-oxide Semiconductor) which is able to simultaneously handle an analog signal and a digital signal. The EEPROM is a memory able to rewrite data by an electronic signal from main CPU 20. The EEPROM is able to store data and programs once written therein indefinitely without the backup of the electric power. In this EEPROM, various data of the operating state of the camera, such as the winding-/rewinding state of the film, the number of the frame exposed, etc., are memorized every moment, and even if the battery is removed for some reason, all actions thereof can be resumed as soon as the battery is restored. The CMOS undertakes the processing of video signals from a CCD (Charge Coupled Device) 26, the driving of a lens driving motor 27 for AF(Auto Focus) and a shutter release magnet 28 (not described, and the driving of the film advance motor 29, etc.

The operation of the control circuit and the operation of a camera based thereon will be described next with reference to FIGS. 6 through 10. The matters which will be described hereinafter are limited to those directly relating to the present invention, such as loading of the film, winding of the film, rewinding of the film, etc., but those are not described, which are not directly related to the present invention such as photometry, the control of shutter speed, the diaphragm, the stroboscopic light quantity based on the results of photometry, auto focus based on range finding and the result therefrom, the establishment of various modes by the user, etc. When the main switch is OFF, the actions of the photometry, the range finding, the shutter release, etc., as well as the actions of the motors 27 and 29, are locked in principle. For the simplicity of description, it will be described only the operation when the main switch is on.

[Main Flow Chart]

Figure 6:
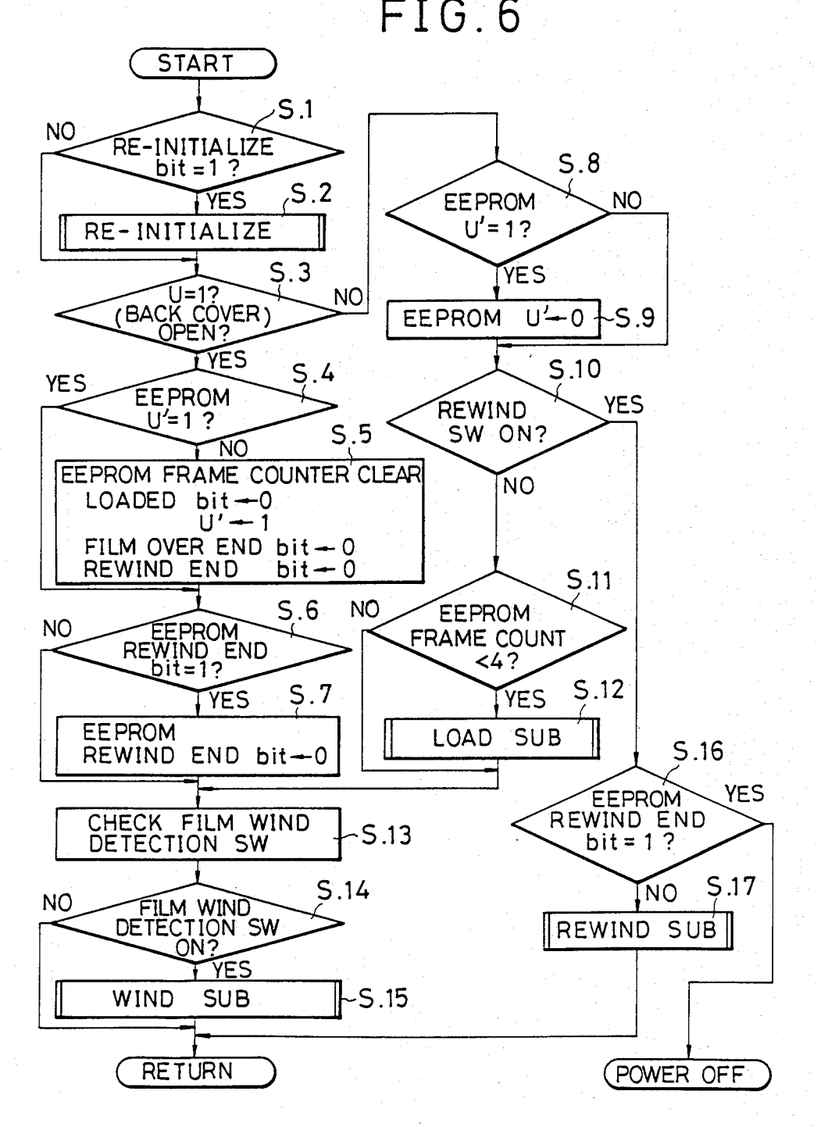
FIG. 6 is a main flowchart.

First, the outline will be described with reference to the main flowchart of FIG. 6.

When started, main CPU judges whether the re-initialize bit is 0 or 1 in Step (hereinafter simply referred to as "S.") 1. The re-initialize bit becomes 1 when the IPU 22 judges that the voltage of the battery is restored after it was once lowered than below a predetermined value, due to the exchange of the battery, etc. When it is judged as 1, then it goes to S', where a re-initialize sub-routine as will be described afterward is processed. On the other hand, when it is judged as 0, it goes directly to S.3.

In S.3, IPU 22 judges whether the latest information U on the ON/OFF of the back cover switch 15 is 0 or 1. The latest information U becomes 1 when the back cover 9 is opened, but it becomes 0 when the back cover 9 is closed. The state of back cover switch 15 is detected by the IPU 22 with a cycle of about 100 ms. When the detected result is different from the information U' of the back cover switch 15 in the preceding cycle, the back cover switch bit of the EEPROM in the PCU 23 is rewritten through the main CPU 20.

If it is judged as YES in S.3, i.e., in case U=1 (the back cover 9 is currently opened), the IPU 22 calls the information U' of the back cover switch 15 in the preceding cycle in S.4 and judges whether or not it is 1.

If it is judged as NO in S.4, i.e., in case U'=0 (the back cover was closed in the state before 100 ms), it is understood that the close → open operation has been performed in the 100 ms. In this case, the power of the main CPU 20 is compulsorily charged by a signal from the IPU 22, and the main CPU 20 performs the opening procedure of S.5, i.e., the number of the frames memorized in the EEPROM is cleared, the loaded bit, the film over-end bit, and the film rewind end bit (these will be described afterward) likewise within the EEPROM are made to 0, and the information U' is made to 1. Thereafter, the procedure in S.6 is performed.

If it is judged as YES in S.4, i.e., in case U'=1, it is understood that the back cover 9 was opened before that time in such case, it goes to S.6 skipping S.5.

In S.6, the main CPU 20 calls the film rewind end bit from the EEPROM and judges whether it is 1. The film rewind end bit becomes 1 from when the film advance motor is rotated by setting the film rewind switch 19 in a rewinding position until a time when the back cover 9 is opened after the motor has stopped rotating, but it becomes 0 in other state.

Since the back cover 9 is opened here, the film rewind switch 19 is normally restored to its OFF position. Therefore, the film rewind end bit must become 0 when the back cover 9 has been opened by the procedure of S.5. However, under some exceptional circumstances, it can be considered that the film rewind end bit becomes 1 even if U=U'=1. In such cases, the film rewind end bit is made to 0 in S.7, and it then goes to S.13. If the bit is 0, it goes to S.13, skipping S.7.

If the judgement is negative in S.3, i.e., in case the back cover 9 is currently closed, then it goes to S.8, and the IPU 22 calls information U' from the EEPROM and judges whether or not it is 1 in the same procedure as S.4. Since U=0 here, the information U' is not required to be rewritten when U'=0, but the information U' is rewritten only when U'=1.

Thereafter, the DUP 21 judges whether or not the film rewind switch 19 is ON in S.10. If the film rewind switch 19 is OFF, then it goes to S.11. The main CPU 20 calls the frame number from the EEPROP in this Step and judges whether or not it is less than four. The frame number mentioned here can be detected from the number of the ON/OFF actions of the film wind detection switch after the back cover 9 is made open→close. The IPU 22 displays counts the frame number memorized minus three on the LCD panel 8.

In this camera, when film loading is performed to set the film, since the reference of the loaded is the advancement of the four frames of the film, if the judgement is affirmative in S.10, the film loading sub-routine is called in S.12 and the film loading procedure is performed as will be described afterward. If the judgement is negative, i.e., in case the frame number memorized in the EEPROM is four or more, it is regarded that the film loading has been completed and it goes to the aforementioned S.13, skipping S.12.

In S.13, the main CPU 20 detects the ON/OFF position of the film wind detection switch 25.

If the switch 25 is ON, since it means that the film winding procedure has not been completed, it goes to S.15 and process in a film wind sub-routine as will be described afterward. If the film wind detection switch 25 is OFF, it returns and an other AE procedure or AF procedure is performed.

If it is judged in S.10 that the film rewind switch 19 is ON, the main CPU 20 calls a film rewind end bit from the EEPROM in S.16 and judges whether or not it is 1. If the judgement is negative in S.16, i.e., in case the film rewind end bit is 0, it is considered that the film rewinding procedure is not completed and a film rewind sub-routine is called in S.17.

If the judgement is YES in S.16, i.e., in case the film rewind end bit is 1, since it is regarded that the film rewinding procedure is completed, it returns skipping S.17 and other AE procedure or AF procedure is performed.

The foregoing becomes the main flowchart. As described in the foregoing, the camera of the present invention is constituted such that the state of the back cover switch is detected with a predetermined cycle and memorized in a memory, and the detecting result of the preceding cycle memorized is compared with the latest detecting result so as to judge a change of the back cover switch with the passage of time. Because it can judge not only the stationary opening/closing state of the back cover but also a moving state such as open→close or close→open from an information of a single piece of the back cover switch. As a result, the camera can perform much more control based on these information.

[Load Subroutine]

Next, the film loading procedure shown in S.12 of the main flowchart will be described.

The film loading operation occurs when film is loaded in a camera. In this camera, when a film cartridge is dropped in a film cartridge chamber 10, the leading end of the film is stretched across to the spool 13, and the back cover 9 is closed, and the film advance motor 29 automatically loads and advances the film up to an exposable section. Moreover, this camera detects a DX code (showing the ISO sensitivity of the film) imprinted on the film cartridge when the film is loading, this operation will be briefly hereinafter described.

Figure 7:
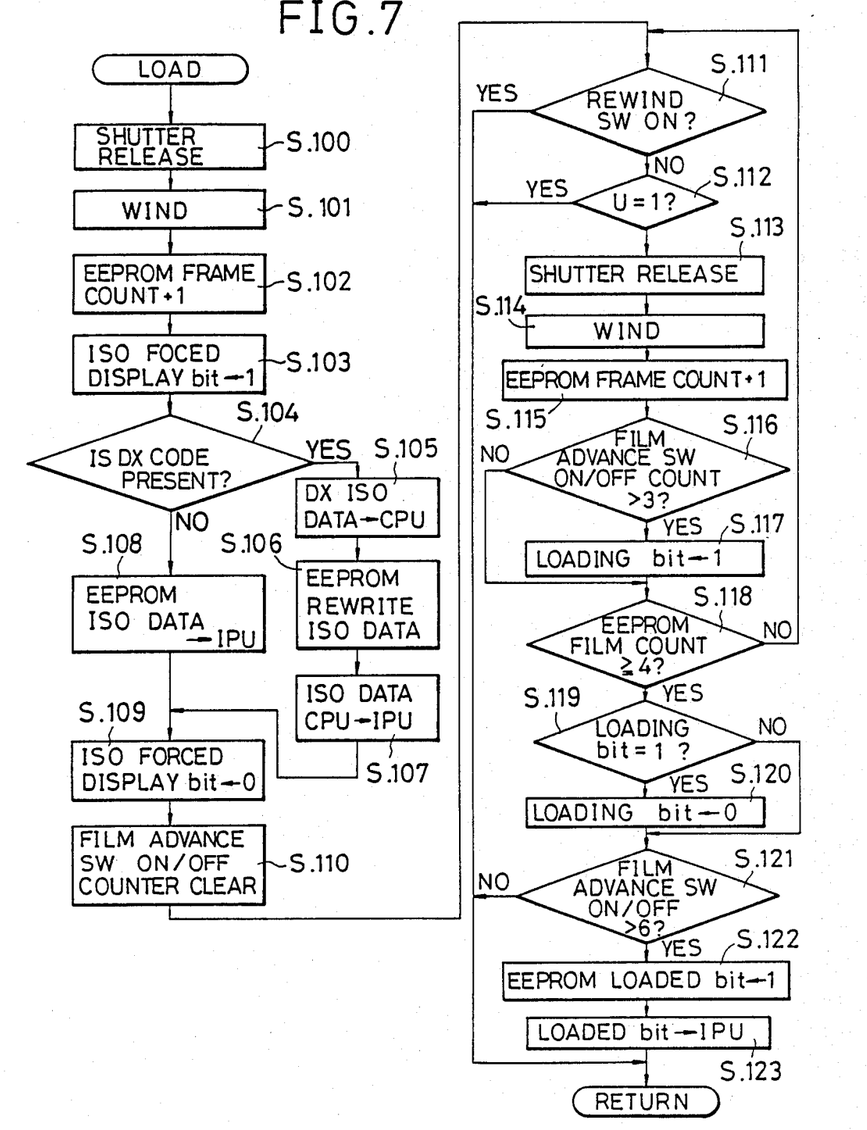
FIG. 7 is a flowchart relating to a loading of the film.

FIG. 7 is a flowchart of the load. Those which are allowed to enter into this load flowchart are such that as the back cover 9 is closed, the film rewind switch 19 is OFF and the frame number memorized in the EEPROM is less than four as previously mentioned.

First, in S.100, a driving voltage is sent to the shutter release magnet 28 from the PCU 23 by a shutter release signal from the main CPU 20, and, as a result, the shutter is released. When the shutter has been released, the film wind detection switch 25 is brought to its ON position. In S.101, the sprocket 12 and the spool 13 are rotated in accordance with the rotation of the film advanced motor 29 until the film wind detection switch 25 is OFF and one frame on the film is wound. In S.102, one count is added to the film counter of the EEPROM. The details of this film winding procedure will be described when the film wind subroutine is described.

In S.103, the main CPU 20 sets the ISO forced display bit to 1 so that the IPU 22 is given approval to display the ISO data on the LCD panel 8 when ISO data communication is performed between the main CPU 20 and the IPU 22.

In S.104, the main CPU 20 judges whether or not the Dx code is present in the film cartridge set and if affirmative, then it goes to S.105 where the main CPU 20 reads the DX code. In S.106, the main CPU 20 rewrites the ISO data in the EEPROM in accordance with the ISO data of the Dx code, and in S.107, the main CPU 20 transmits this data to the IPU 22, so that the data is displayed on the LCD panel 8.

If the judgement is negative in S.104, i.e., in case the Dx code is not present in the film cartridge, the main CPU 20 calls the ISO data previously set from the EEPROM and transmits the data to the IPU 22 and the IPU 22 displays the data on the LCD panel 8 in S.108.

When the writing of the ISO data and the transmission of the data for display are finished, the main CPU makes the ISO forced display bit into 0 in S.109.

In S.110, main CPU 20 clears the count, which is disposed therein and adapted to count the ON/OFF of the film advance switch 24.

In S.111 and S.112, the states of the film rewind switch 19 and the back cover switch 15 are judged and if the film rewind switch 19 is ON, or if U=1, it returns to the main flowchart without performing the procedures in S.113 through S.123; and, under other conditions, it goes to S.113.

The film rewind switch 19 is ON during the rewinding of the film or during the period from when the film is rewound till when the back cover 9 is opened. At that time, the rewinding of the film has the priority. It is U=1, when the back cover 9 is opened. In that case, since the film is not required to be loaded, the load is not performed.

If the judgements are both negative in S.111 and S112, it goes to S.113 where the shutter is released in the same way as S.100. In S.114, the film is wound in the same way as S.101. In S.115, one count is added to the frame number in the EEPROM.

When one frame of the film has been wound, it goes to S.116, where the main CPU 20 judges whether or not the count number of the counter, which has counted the number of actions of the ON/OFF actions of film advance switch 24, is larger than three. The film advance switch 24 is constituted so that if the film advances in its normal state, and if no errors due to slip are present between the roller 16 and the film, it repeats the ON/OFF action eight times during the one frame over which the film advances. However, if the film does not advance because of non-loading of the film, insufficient loading of the film, etc., the film advance switch 24 is not turned ON/OFF.

If the judgement is affirmative in S.116, the main CPU 20 regards that the film starts advancing and makes the loading bit into 1 in S.117. When this bit has been made 1 the IPU 22 generates a driving signal to the LCD panel 8 to light up a segment (a) among a plurality of segments of the LCD panel 8, and gradually blinks the remaining segments b1, b2, b3, b4 and c from the film cartridge side to the spool side so that the photographer can visually recognize the loading state of the film.

To the contrary, if the judgement is negative in S.116, the main CPU 20 judges that the film is not advanced, and it skips S.117 without performing the above-mentioned display, and performs the procedure of S.118.

In S.118, the main CPU 20 judges whether or not the frame number in the EEPROM becomes four or more, i.e., whether or not the shutter release and the film winding are repeated four times, which is the necessary number of times for loading the film. If the frame number does not reach the predetermined value, it returns to S.111 and this loop is repeated until the judgement becomes YES in S.118. When it escapes from this loop, it goes to S.119 and S.120, where the main CPU 20 makes the loading bit into 0 if the loading bit was 1.

In S.121, the main CPU 20 judges whether or not the total count number of the ON/OFF actions of the film advance switch 24 is larger than six. If the total is larger than six, the main CPU 20 regards that the film has been normally loaded, then makes the loaded bit of the EEPROM into 1 in S.122, and then transmits this bit to IPU 22 in S.123 to blink all of the segments a, b and c of the LCD panel 8 as an indication of "film loaded". The photographer can visually recognize the completion of the film loading from this indication.

If the judgement is negative in S.121, the main CPU 20 regards that the film has not been loaded normally and it returns to the main flowchart, skipping S.122 and S.123.

[Wind Subroutine]

Figure 8:
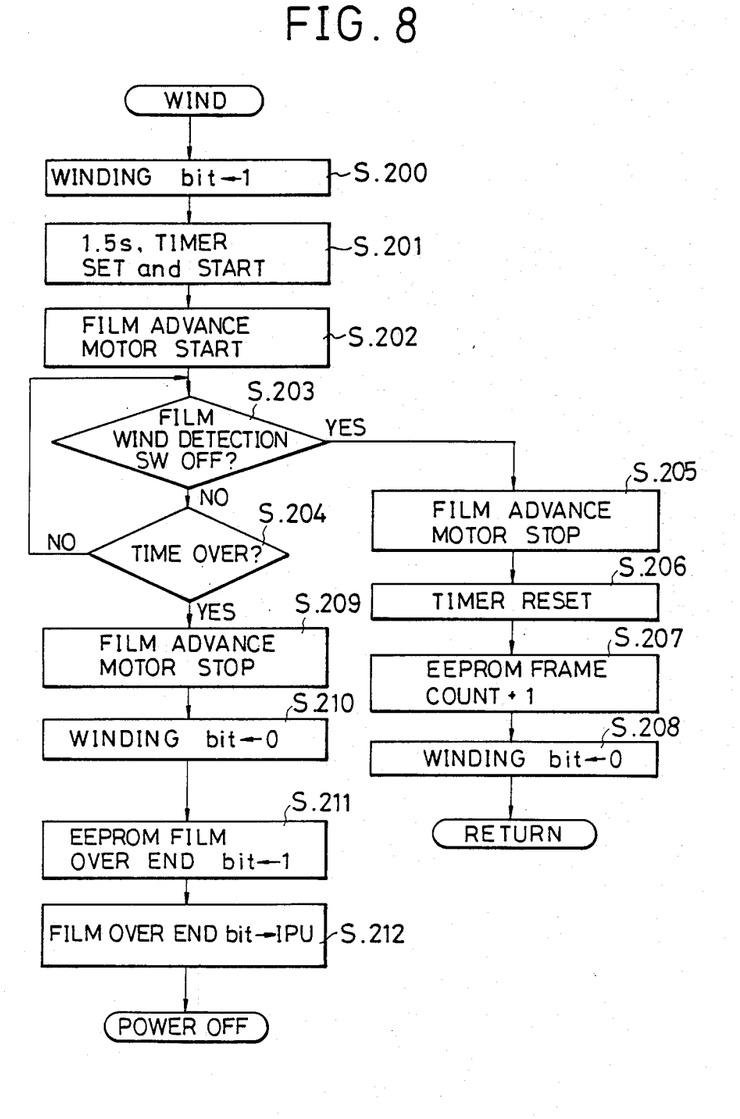
FIG. 8 is a flowchart relating to winding of the film.

Next, we will describe S.15 in the main flowchart and the film wind subroutine with reference to FIG. 8.

The film winding is a procedure for winding one frame of the film after the shutter is released. This film winding is automatically performed in this camera by the film advance motor as previously described.

As understood from the main flowchart, film winding is performable, whether the back cover 9 is opened or closed as long as the main switch 3 is ON. However, it is not activated when the film is all exposed and the film overend bit becomes 1, and when the film is rewound and the film rewind end bit becomes 1.

If the main CPU 20 judges that the film wind detection switch 25 is ON in S.14 of the main flowchart, i.e., if the main CPU 20 judges that film winding is not completed, the CPU 20 first makes the film winding bit into 1 in S.200. This bit information is transmitted to the IPU 22. Then, the IPU 22 causes the segments a and c of the LCD panel to light up and also causes the segments b1, b2, b3 and b4 to blink gradually from the film cartridge chamber 10 side to the spool 13 side. The photographer can visually recognize from this indication that the film is being wound.

Then, in S.201, the main CPU 20 sets and starts a timer for 1.5 seconds and generates a driving signal to the PCU 23. The PCU 23 starts the rotation of the film advance motor 29 to rotate the sprocket 12 and the spool 13 in S.202.

The rotation of the motor 29 is regulated by either one of the two elements; OFF of the film wind detection switch 25 and time over due to power supply for 1.5 seconds or more.

That is, the main CPU 20 judges the state of the film wind detection switch 25 in S.203. If the film wind detection switch 25 is not OFF here, the main CPU 20 judges whether or not 1.5 seconds passed from when the timer has been set in S. 2204. If both of the judgements are negative, it goes around the loop of S.203 and S.204. And, if the judgement in any one of the steps becomes affirmative, it escapes from the loop there. The procedure thereafter will be different, depending on which step it escaped from. If it escaped from S.203, the film wind detection switch 25 is OFF, and, therefore, the main CPU 20 regards that the film advance motor 29 is rotated to an extent enough sufficient for advancing one frame of the film, then controls the PCU 23 to stop the film advance motor 29 in S.205 and resets the timer so as to be ready for next film winding in S.206.

Next, the frame number in the EEPROM is added with 1 in S.207 and after making the film winding bit set in S.200 into 0 in S.208, it returns to the main flowchart.

If it escapes from the loop in S.204, i.e., in case it passed 1.5 seconds before the film wind detection switch 25 is OFF, the main CPU 20 controls the PCU 23 to stop the film advance motor 29 in S.209 and to make the film winding bit into 0 in S.210. This situation is realized in general when all frames of the film are exposed and no further rotation of the film advance motor 29 is allowed.

In that situation, the CPU 20 makes the film overend bit of the EEPROM into 1 in S.211 and transmit the bit to IPU 22 in S.212. The IPU 22 actuates the LCD panel 8, light up the segment a, and synchronously blinks segments b and c in accordance with this signal.

When the film overend bit is 1, the DPU 21 cuts off the power supply to the main CPU 20. As a result, no other operation than the film rewinding can be performed.

In this camera, when the power supply to the main CPU 20 is cut off as mentioned above, operation of the shutter release switch, etc., is locked, and the camera is prohibited from performing any unnecessary operations. As a result, no breakage of the film and no load to the film advance system take place, as often occurs in the conventional cameras. This is desirable both for the film and camera.

[Rewind Subroutine]

Figure 9:
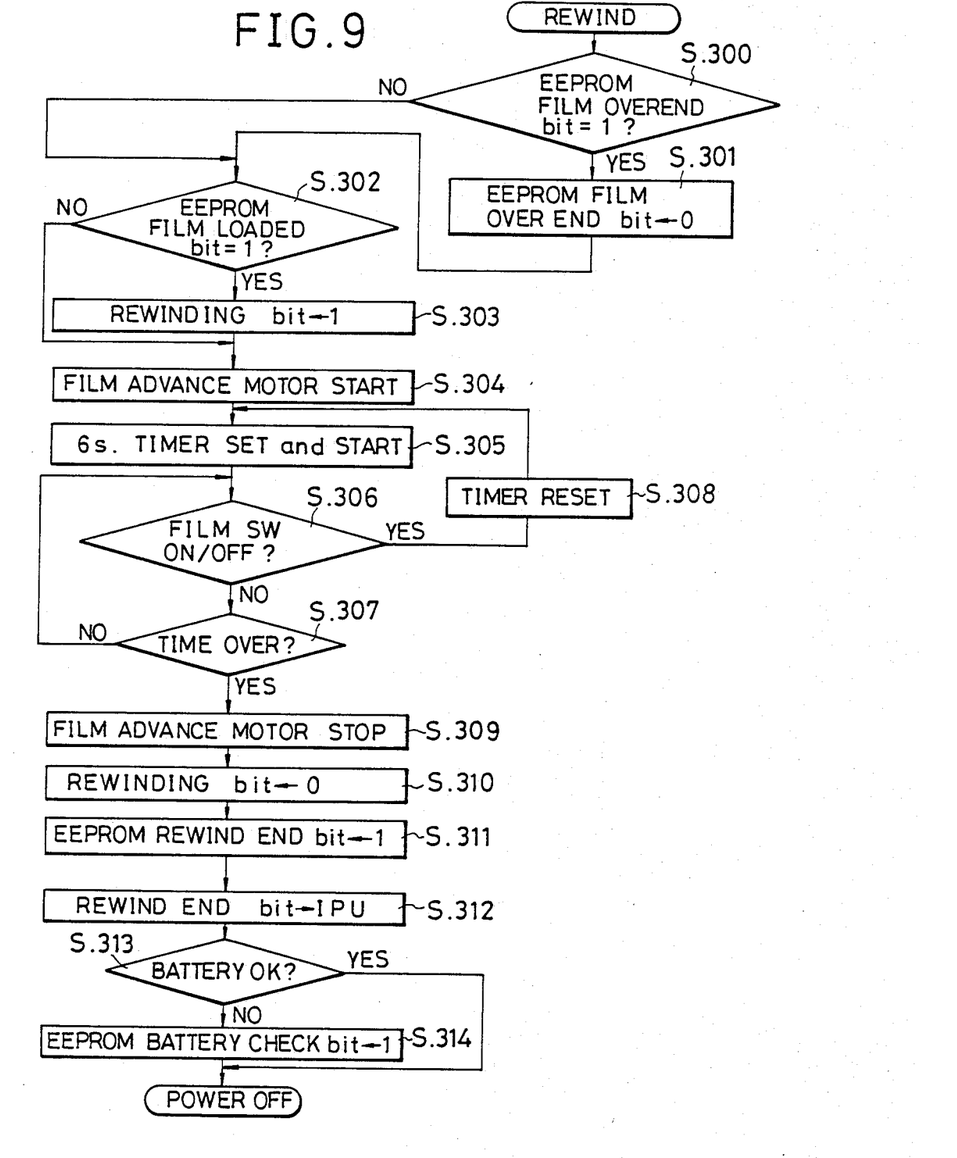
FIG. 9 is a flowchart relating to rewinding of the film.

FIG. 9 illustrates a flowchart of the film rewind subroutine or rewind subroutine shown in S.17 of the main flowchart.

The film rewinding is a procedure for rewinding an exposed film and/or unexposed film into the film cartridge. In this camera, this procedure is automatically performed by the film advance motor 29 when the film rewind switch 19 is ON with the back cover 9 closed, as previously mentioned.

In the film rewind flowchart, the main CPU 20 first calls the afore-mentioned film overend bit from the EEPROM in S.300, and judges whether or not the bit is 1. If the bit is 1, the main CPU 20 makes it into 0 in S.301, whereas if the bit is 0, it goes to S.302, skipping S.301.

In S.302, the main CPU 20 judges whether or not the afore-mentioned loaded bit is 1 and if the bit is 1, the main CPU 20 makes the film rewinding bit into 1 and transmits it to the IPU 22 in S.303.

The IPU 22 causes the segments a and c of the LCD panel 8 to light up and the remaining segments b1, b2, b3 and b4 to blink gradually from the spool side to the film cartridge chamber 10 side. If the film loaded bit is 0, it goes to S.304, skipping S.303.

In S.304, the rotation of the film advance motor 29 is started to rotate the film rewind spindle 11. The main CPU 20 sets and starts the timer of 6 seconds in S.305 and judges whether or not the film advance switch 24 is turned ON/OFF in S. 306. If the main CPU 20 judges that the film advance switch 24 is not turned ON/OFF, it goes to S.307 wherein the main CPU judges whether or not the time is over. If the main CPU 20 judges that the time is not over, it performs the judgement of S.306 again. Even if the main CPU 20 judges that the film advance switch 24 is not turned ON/OFF, it goes around the loop of S.306 and S.307 for 6 seconds.

If the film advance switch 24 is turned ON/OFF in the middle of the procedure, the main CPU 20 resets the timer in S.308 and newly sets and starts the timer in S.305.

It can escapes from such two ways of the loop when it passes 6 seconds minimum after the film advance switch 24 has been turned ON/OFF last. This period of 6 seconds is established taking into consideration the time from when the film left the roller 16 in order to for causing the film advance switch 24 to be turned ON/OFF until when the film is completely contained in the film cartridge. Of course, some additional time is included therein.

After escaping from the loop because of time over, it goes to S.309, where the film advance motor 29 is stopped.

In S.310, the main CPU 20 makes the rewind bit of the EEPROM into 0, and then, the IPU 22 stops the display while the LCD panel 8 is being rewound.

Then, the main CPU makes the film rewind end bit of the EEPROM into 1 in S.311 and transmits this data to the IPU 22 in S.312. The IPU 22 causes the segment a of the LCD panel 8 th blink thereby to indicate the completion of the film rewinding procedure.

In S.313, the main CPU 20 checks with the state of the battery when the film rewind end bit is made into 1. If the voltage of the battery is a predetermined value or less, the main CPU 20 makes the battery check bit of the EEPROM into 1 in S.314. In other cases, the power OFF procedure is performed skipping S.314.

In that state, other procedures cannot be performed unless the film rewind end bit is made into 0 by opening the back cover 9 under usual practice.

The details of the procedures in S.313 and S.314 will be described hereinafter under the subtitle of "Reinitialize Subroutine".

[Reinitialize Subroutine]

Figure 10:
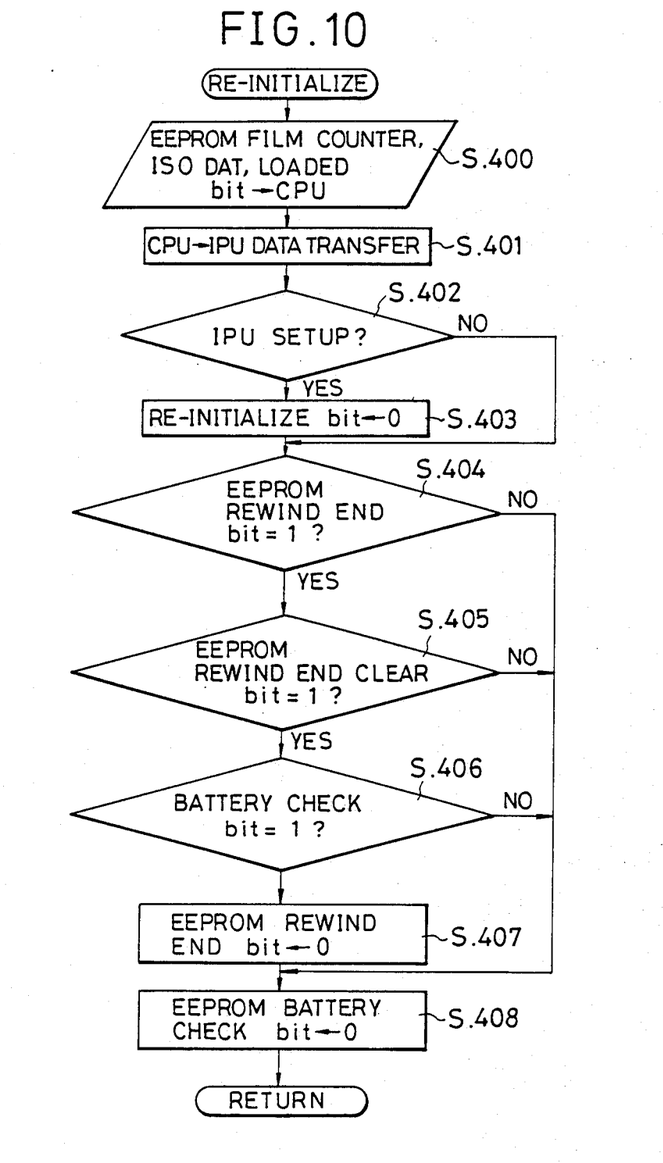
FIG. 10 is a flowchart relating to a reinitializing procedure.

FIG. 10 illustrates a subroutine for performing a reinitializing procedure shown in S. 2 of the main flowchart. The reinitializing procedure is performed when a power voltage of the battery is restored, after it has once been reduced to a predetermined value, for example, after the battery is placed in a low temperature state where the capacity of the battery is degraded, it recovers the normal capacity due to temperature increase.

The data can be stored in the RAM of the main CPU 20 and the IPU 22 as long as the voltage of the battery is held to a predetermined value or more. However, in that case, once the power is cut off, these data are erased.

In this camera, since a portion of the variable data i.e, the portion undesirable to be erased even if the power is cut off, is memorized in the EEPROM, this portion of data can be called after the battery voltage is restored.

In S.400, the main CPU 20 reads various data memorized in the EEPROM and transmits the data to the IPU 22 in S.401.

In S. 402, the main CPU 20 judges whether or not the data has been transmitted to the IPU 22, and makes the reinitialize bit into 0 in S. 403 if the establishment is finished. If the establishment is not finished, it skips S.403.

Then, in S.404, the main CPU 20 judges whether or not the film rewind end bit of the EEPROM aforementioned is 1. If the main CPU 20 judges that this bit is 0, it returns to the main flowchart, skipping S.405 through S.407, whereas if the main CPU 20 judges that the bit is 1, it judges whether or not the film rewind end clear bit written in the EEPROM is 1.

This film rewind end clear bit is established to 0 or 1 when the camera is delivered. If the bit is 1, the film rewind end bit memorized in the EEPROM is made into 0 under certain conditions.

The film rewind bit becomes 1 in such general cases as when the film is completely contained in the film cartridge as described. In addition to the afore-mentioned general case, the film rewind bit also becomes 1 in the following case.

That is, a thinkable possible case is that the power voltage is lowered due to consumption of the battery, or the capacity of the battery is degraded due to cold outer air during the film rewinding procedure. If the power voltage, thereof is degraded, an adverse effect occurs on the motor or the like, which consumes a large amount of power. Accordingly, even if the control circuit of the detection system is activated, the film advance motor 29 is sometimes stopped. In that case, the rewind end bit sometimes becomes 1 before the film is completely contained in the film cartridge.

In the afore-mentioned electronically controlled camera, the rewinding operation is performed by activating the motor by the control circuit, contrary to a conventional manual rewinding operation. Accordingly, if the film rewind bit is made into 1 under judgement different from the actual situation as mentioned, the camera is unable to perform other operations unless the back cover 9 is opened.

If the back cover 9 is opened before the exposed film is contained in the film cartridge, the exposed film becomes wasted unless the procedure is performed in a dark room, etc. In this camera, therefore, as referred to in S.312, S313 and S314 regarding the film rewinding procedure, the battery state is checked at the time when the film rewind end bit is set to 1, under the condition that the film rewind end clear bit is set to 1, and if the voltage of the battery does not reach a predetermined value, the battery check bit of the EEPROM is set to 1.

When the battery check bit is 1, the main CPU 20 judges that the procedure is performed under a judgement different from the actual situation, as mentioned above, and makes the film rewind end bit into 0 in S.407.

In the event the reinitialize subroutine is called, since there is the premise that the voltage of the battery is restored to a predetermined value or more, the battery check bit is not required to be made 1. Therefore, in S.408, this bit is made into 0 and then returns to the main flowchart.

The afore-mentioned erroneous judgement possibly occurs when the film is wound, in addition to its occurrence when the film is rewound. The film over end bit may also be made into 1 when all frames of the film are not yet exposed, due to low voltage of the battery by the same reason as when the film is rewound, in addition to the general case where all frames of the film are exposed. If the film over end bit is made into 1 under such circumstance, the camera rejects all other procedures than the film rewinding procedure. As a result, the remaining film is wasted.

This inconvenience can be avoided by performing the same battery check procedure as S.313 for the film rewinding procedure, at the time when the film overend bit is made into 1. If so, the film overend bit, which was set under a judgement different from the actual situation, can be made into 0 during the reinitializing procedure. As a result, the remaining film is safe and usable.

Since this camera is formed such that date written by erroneous judgement can be erased by a judgement of the camera itself, the possible occurrence of erroneous judgement can be avoided when the battery voltage is lowered. Moreover, it can sufficiently take advantage of the employment of a memory in which, once data is memorized therein, no further check is required under ordinary circumstance when the data is used next.

So far, the description on the operation of the film advance relation with reference to the flowchart is finished.

As understood from the foregoing description, since an electronically controlled camera according to the present invention is provided with a large scaled control circuit which conventional cameras are not provided with, in order to lighten the user's operating difficulty, the user can operate the camera more correctly and adequately.

And, the EEPROM employed as a memory for variable data ensures that the user will be able to operate the camera more correctly. Even if a camera is equipped with a versatile control circuit, if variable data set before removal due to the removal or loading of the battery, etc. is erased, the user may have difficulty in using it. In this respect, an electronically controlled camera, according to the present invention, can store various variable data whether the battery is removed or loaded, and is thus very convient for a user.

What is claimed is:

1. An electronically controlled camera comprising
    a back cover switch adapted to be turned ON/OFF in accordance with the opening/closing position of a back cover;
    back cover switch data detecting means for detecting switch data relating to said back cover switch, at a predetermined cycle and for outputting said switch data;
    an erasable programmable memory for memorizing the switch data output from said back cover switch data detecting means; and
    control means for comparing the most recent switch data output from said back cover switch data detecting means with the switch data from a preceding cycle read from said memory, and for controlling a film advance motor, a display system and said memory.

2. The electronically controlled camera according to claim 1, wherein said memory is an EEPROM (Electronically Erasable Programmable Read-Only Memory).

3. The electronically controlled camera according to claim 1, wherein said control means clears a film number counter, a loaded bit, a film overend bit, and a film rewind end bit in said memory when the most recent switch data is "back cover open" and the preceding cycle switch data is "back cover closed."

4. An electronically controlled camera comprising
film loading start signal generating means for setting the start time of a film loading;
a film advance motor and driving means for feeding a drive current to said film advance motor;
a film advance switch adapted to be turned On/OFF in accordance with the advancement of film;
signal output means for allowing said drive current to be fed to said film advance motor when a film loading start signal is input, and for outputting a film loading signal when the number of ON/OFF actions of said film advance switch is at least equal to a predetermined number;
an erasable programmable memory for setting a film loading bit when a film loading signal is output from said signal output means; and
display means for displaying film loading information in such a manner that a photographer can visually recognize loading information when the film loading bit is set in said memory.

5. The electronically controlled camera according to claim 4, wherein said memory is an EEPROM.

6. The electronically controlled camera according to claim 4, wherein said film loading start signal generating means generates a film loading start signal when switch data relating to a back cover switch, which is adapted to be turned ON/OFF in accordance with the opening/closing position of a back cover, is "back cover closed and when the value of a film number counter set in said memory is less than a predetermined number.

7. The electronically controlled camera according to claim 4, which further comprises memory rewrite means for clearing said film loading bit and setting a film loaded bit in said memory when the film number memorized in said memory attains at least a predetermined number, and when the number of ON/OFF actions of said film advance switch is at least equal to predetermined number.

8. The electronically controlled camera according to claim 7, which further comprises display means for displaying film loaded information in such a manner such that a photographer can visually recognize the loaded information when the loaded bit is set in said memory.

9. An electronically controlled camera comprising
a film advance motor and driving means for feeding a drive current to said film advance motor;
film overend detecting means for detecting that all of the film is wound and outputting a film overend signal;
an erasable programmable memory in which a film overend bit is set when a film overend signal is output; and
control means for controlling said driving means and prohibiting said drive current from being fed to said film advance motor for winding the film when a film overend bit is set in said memory.

10. The electronically controlled camera according to claim 9, wherein said memory is an EEPROM.

11. The electronically controlled camera according to claim 9, wherein said film overend detecting means comprises a film wind detection switch which is turned off when a film winding action is completed, and a timer which start when the film winding action is started, and which comprises means for outputting a film overend signal when said film wind detection switch is not turned off within a predetermined time set by said timer.

12. The electronically controlled camera according to claim 9, which further comprises display means for display film overend information in such a manner that a photographer can visually recognize the film overend information when a film overend bit is set in said memory.

13. An electronically controlled camera comprising
a film advance motor and driving means for feeding a drive current to said motor;
film rewind end detecting means for detecting that film has been completely rewound and for outputting a film rewind end signal;
an erasable programmable memory in which a film rewind end bit is set when the film rewind end signal is output; and
control means for controlling said driving means and prohibiting said drive current from being fed to said film advance motor when a film rewind end bit is set in said memory.

14. The electronically controlled camera according to claim 13, wherein said memory is an EEPROM.

15. The electronically controlled camera according to claim 13, wherein said film rewind end detecting means comprises a film advance switch which is turned on/off in accordance with the advancement of the film, and a timer which starts as soon as the film rewinding procedure is started and which is reset each time that said film advance switch is turned on/off, and which comprises means for outputting a film rewind end signal when said film advance switch is not turned on/off in a predetermined time set by said timer.

16. The electronically controlled camera according to claim 13, which further comprises display means for displaying a film rewind end information such that a photographer can visually recognize said film rewind end information when a film rewind end bit is set in said memory.

17. An electronically controlled camera comprising
a film advance motor;
driving means containing a battery therein and for feeding a drive current to said film advance motor;
voltage check means for checking whether or not the voltage of said battery is at least equal to a predetermined value;
film overend detecting means for detecting that film is completely wound, and for outputting a film overend signal;
an erasable programmable and nonvolatile memory in which a film overend bit and check data of said voltage check means are written when said film overend detecting means outputs a film overend signal; and
data clear means for reading said check data from said memory and clearing said film overend bit if the battery voltage is a predetermined value or less when the film overend signal is output.

18. The electronically controlled camera according to claim 17, wherein said memory is an EEPROM.

19. The electronically controlled camera according to claim 17, wherein said film overend detecting means comprises a film wind detection switch which is turned off when a film winding action is completed, and a timer which starts as soon as the film winding procedure is started, and for outputting a film overend signal when said film wind switch is not turned off within a predetermined time set by said timer.

20. An electronically controlled camera comprising
a film advance motor;
driving means containing a battery therein and for outputting a drive current to said film advance motor;
voltage check means for checking whether or not the voltage of said battery is at least equal to a predetermined value;
film rewind end detecting means for detecting that film has been completely rewound and for outputting a film rewind end signal;
an erasable programmable and nonvolatile memory in which a film rewind end bit and check data of said voltage check means are written when said film rewind end detecting means outputs a film overend signal; and
data clear means for reading said check data from said memory and for clearing said film rewind end bit if the battery voltage is equal to, or less than, a predetermined value, when the film rewind end bit signal is output.

21. The electronically controlled camera according to claim 20, wherein said memory is an EEPROM.

22. The electronically controlled camera according to claim 20, wherein said film rewind end detecting means comprises a film advance switch which is turned on/off in accordance with advancement of the film and a timer which starts as soon as the film rewinding procedure is started and which is reset everytime said film advance switch is turned on/off, and for outputting a film rewind end signal when said film advance switch is not turned on/off in a predetermined time set by said timer.

* * * * *

UNITED STATES PATENT AND TRADEMARK OFFICE
CERTIFICATE OF CORRECTION

PATENT NO. : 4,855,772
DATED : August 8, 1989
INVENTOR(S) : Isamu HASHIMOTO et al.

It is certified that error appears in the above-indentified patent and that said Letters Patent is hereby corrected as shown below:

At column 13, line 41 (claim 6, line 7), change "cover closed" to ---cover closed"---.
At column 13, line 51 (claim 7, line 8), change "predetermined" to ---a predetermined---.
At column 14, line 9 (claim 11, line 5), change "start" to ---starts---.

Signed and Sealed this

Seventh Day of March, 1995

Attest:

BRUCE LEHMAN

Attesting Officer     Commissioner of Patents and Trademarks